United States Patent [19]

Fordyce et al.

[11] 3,834,681

[45] Sept. 10, 1974

[54] FIREPROOF, PREFAB FILL SUPPORT STRUCTURE FOR COOLING TOWER

[75] Inventors: Homer E. Fordyce, Kansas City; Gerald D. Fritz, Raytown, both of Mo.

[73] Assignee: The Marley Company, Mission, Kans.

[22] Filed: Aug. 17, 1972

[21] Appl. No.: 281,514

[52] U.S. Cl............. 261/111, 52/637, 261/DIG. 11
[51] Int. Cl............................................. B01f 3/04
[58] Field of Search..................... 261/111, DIG. 11; 52/637-638

[56] References Cited
UNITED STATES PATENTS

| | | | |
|---|---|---|---|
| 2,656,168 | 10/1953 | Ayres | 261/DIG. 11 |
| 2,778,693 | 1/1957 | Jagiel | 52/638 |
| 3,226,894 | 1/1966 | Burchardt et al. | 261/111 X |
| 3,743,257 | 7/1973 | Fordyce | 261/DIG. 11 |
| 3,749,381 | 7/1973 | Furlong et al. | 261/DIG. 11 |
| 3,758,088 | 9/1973 | Fordyce | 261/111 |

FOREIGN PATENTS OR APPLICATIONS

| | | | |
|---|---|---|---|
| 543,866 | 3/1942 | Great Britain | 261/DIG. 11 |
| 1,454,826 | 10/1966 | France | 52/638 |

Primary Examiner—Tim R. Miles
Assistant Examiner—Richard L. Chiesa
Attorney, Agent, or Firm—Schmidt, Johnson, Hovey & Williams

[57] ABSTRACT

Prefabricated, open-frame panel members of fireproof material such as concrete are stacked on edge to produce a number of side-by-side, multi-level uprights which, in turn, are laterally braced and interlocked into a rigid construction by prefabricated, open-frame bracing elements interposed between opposed panel members of each level of the uprights. The bracing elements of the structure are arranged in a number of parallel, diagonal series extending across the uprights with adjacent elements in each series being in partial juxtaposition with one another so that external forces applied to the structure are resisted by directing such forces diagonally into the ground along each series of cooperating elements. The sheer mass of the individual panel units and bracing elements contributes substantially to the structural rigidity of the completed structure, yet each unit and element may be readily hoisted into position by conventional industrial lifting equipment. Heat exchange fill suspended within the completed structure is disposed to receive water gravitating therethrough to cool the water as ambient air flows through the open structure to impinge upon the fill.

18 Claims, 6 Drawing Figures

FIREPROOF, PREFAB FILL SUPPORT STRUCTURE FOR COOLING TOWER

This invention relates to water cooling towers and, more particularly, to prefab frame structure between the hot water distributor and the cold water collection basin of such towers for supporting heat exchange fill assemblies.

The erection of relatively tall, high capacity water cooling towers at selected installation sites necessarily involves great expense in terms of both labor and materials. Ideally, much of this expense could be eliminated through the provision of modular or prefab construction techniques for the structure which supports the heat exchange fill of the tower, but the use of such techniques is not as straightforward as it may at first appear for a number of reasons, not the least of which is the fact that most high capacity towers must be custom-built to fit the needs of each particular installation.

Another consideration affecting the adoption of prefab construction techniques for this purpose is the exposure of the fill supporting structure to earthquake tremors and to a lesser extent continuous buffeting of winds which, in the case of tall, rectilinear, high capacity towers, may reach velocities of a magnitude which would topple or at least seriously damage structures not sturdily built in a manner to resist such forces. Thus, it is important that such structures, whether prefab or not, have sufficient structural continuity or cohesion to inherently resist the effects of earth tremors as well as winds.

Another facet to consider is the material from which the prefab components are constructed. Wood products could be used, but the supply of suitable lumber such as redwood, spruce and fir is diminishing and such wood products are highly susceptable to fire. Moreover, the components must still be fabricated by fastening properly sized lengths of lumber together in laborious piecemeal fashion, and the finished wood component is necessarily relatively light in weight, the latter aspect diminishing the ability of the structure to resist winds.

In view of the above considerations, one important object of the present invention is to provide relatively high-rising supporting framework structure for the evaporative heat exchange fill of a water cooling tower wherein the structure is constructed from prefabricated, stackable frame components to eliminate laborious, piecemeal construction steps heretofore required, yet the composite structure thus produced has the inherent stability and rigidity to resist external forces applied thereto by strong winds.

Another important object of the present invention is to provide supporting framework structure constructed from prefabricated components as aforesaid wherein one group of the components comprise bracing elements arranged in diagonally descending rows and in force-transmitting relationship to one another to direct such externally applied forces earthward along the rows of cooperating elements.

An additional important object of the instant invention is the provision of fill supporting structure of stackable prefabricated components wherein the upright, fill receiving bays of the structure defined by adjacent stacks of components may each be individually erected to their full heights before proceeding with the formation of adjacent bays, thereby effecting substantial economies in terms of hoisting equipment location and stabilization not possible where each level of the entire structure must be completed before building the next level thereon.

A further important object of this invention is the provision of prefabricated components for the fill supporting structure which are essentially planar and of open-frame construction, thereby lending themselves well to edgewise stacking and facilitating handling, storage, and transport.

A still further important object of the present invention is to provide fill supporting structure of prefabricated stacked components wherein each level of the structure is interlocked with the next adjacent level to provide structural rigidity.

Another important object of this invention is to provide prefabricated frame components of massive fireproof material such as concrete so that the components by their respective masses alone contribute significantly to the rigidity, stability and cohesion of the structure, the weight of the individual components not being so great, however, that they cannot be hoisted in place by conventional lifting equipment.

Figure 5:
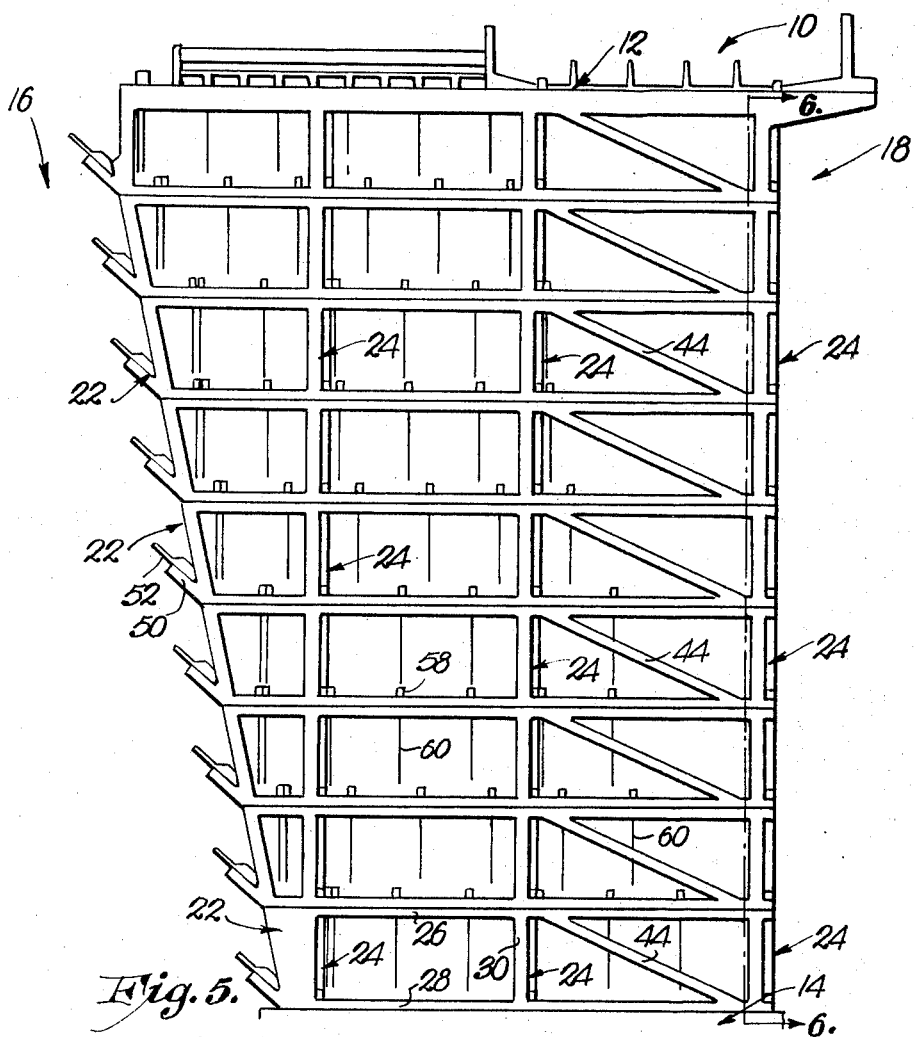
FIG. 5 is an essentially schematic, side elevational view of the structure.

The structure of the present invention is broadly denoted by the numeral 10 throughout the Figures and is disposed between suitable hot water distributor means such as a basin 12 and cold water collection means 14, all as shown schematically in FIG. 5. It is to be understood that the specific structural details of basin 12 and collection means 14 are not critical to the basic tenets to the present invention and may be of conventional design. Furthermore, the structure 10 has been illustrated in the drawings and will be described hereinafter in connection with a crossflow water cooling tower as opposed to a counterflow tower, but it will be recognized that structure 10 has equal utility in both types of towers.

In accordance with the crossflow mode of operation of the tower with which structure 10 is associated, structure 10 has what is broadly denoted as an inlet side 16 for ambient air and an air outlet side 18 communicating directly with the plenum chamber of the cooling tower. Hot water delivered to the distributor basin 12 gravitates therefrom through structure 10 toward collection means 14 and is cooled during its journey through structure 10 by the action of air from inlet side 16 impinging upon heat exchange fill structure (hereinafter described) located within and supported by structure 10. The moisture-laden air then departs from structure 10 through the outlet side 18 for subsequent discharge as a plume from the tower through the plenum chamber and stack or chimney thereof, and the cold water received by collection means 14 is subsequently recycled to the equipment being cooled.

The structure 10 is supported by suitable means such as a plurality of horizontally extending piers 20 which may form a part of or otherwise be associated with the cold water collection means 14. In the event that the cooling tower with which structure 10 is associated is of a generally rectangular configuration at its base, the piers 20 will normally extend in parallelism with one another. However, in the event that the cooling tower is circular in nature, in which case the structure 10 is encircled about a central plenum chamber of the tower, the piers 20 will extend radially from the central axis of the tower, diverging as the inlet side 16 of structure 10 is approached.

Figure 1:
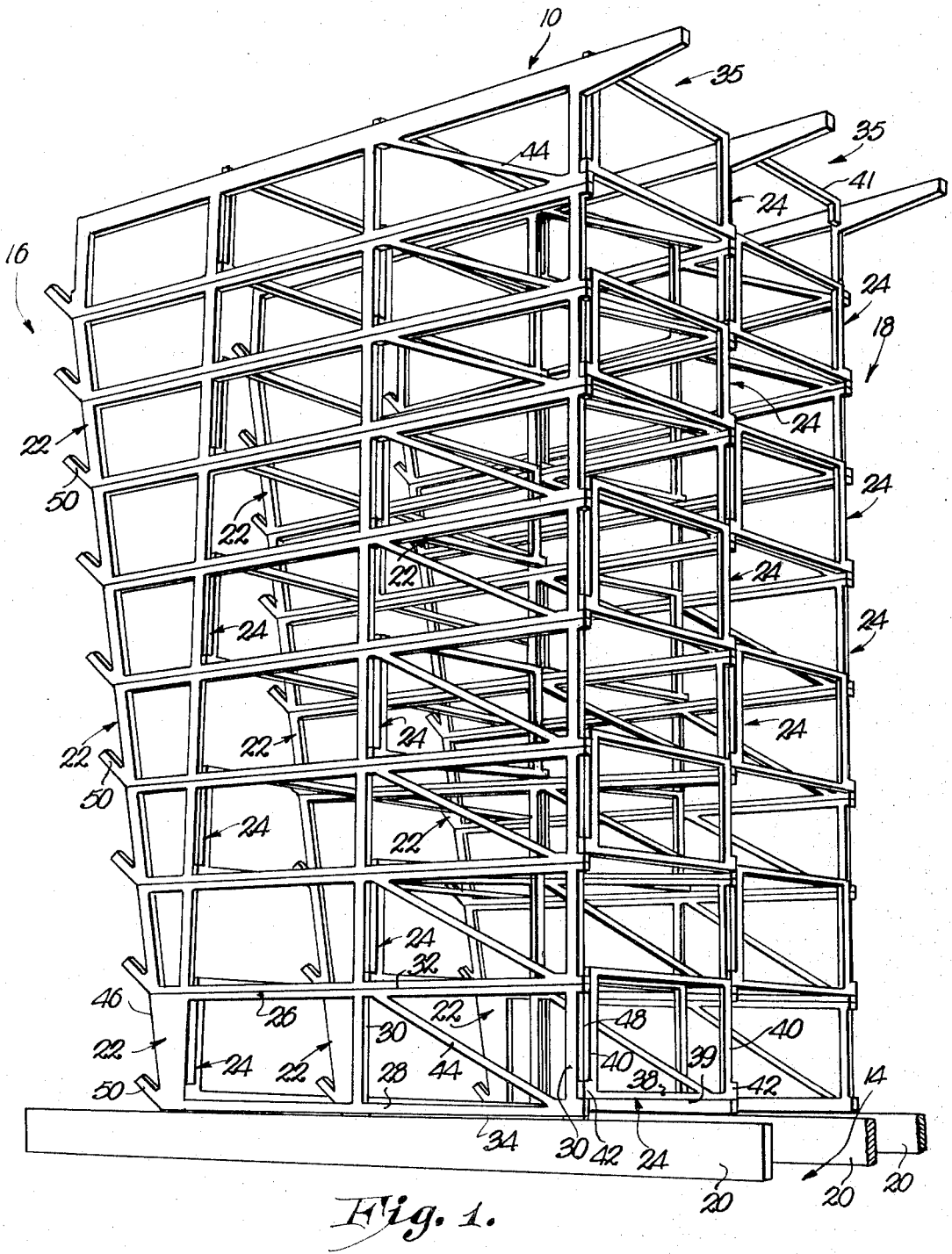
FIG. 1 is a perspective view of a typical section of fill-supporting structure constructed from prefabricated components in accordance with the principles of the present invention and forming a pair of side-by-side, fill receiving bays.
Figure 2:
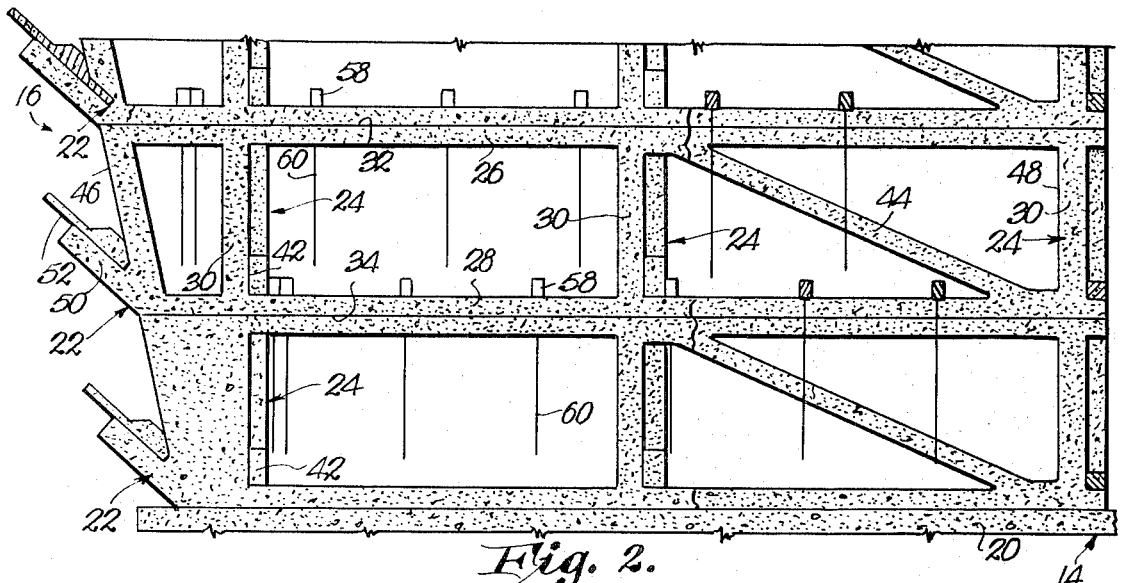
FIG. 2 is an enlarged, fragmentary side elevational view of the structure at one lower, outer corner thereof.
Figure 3:
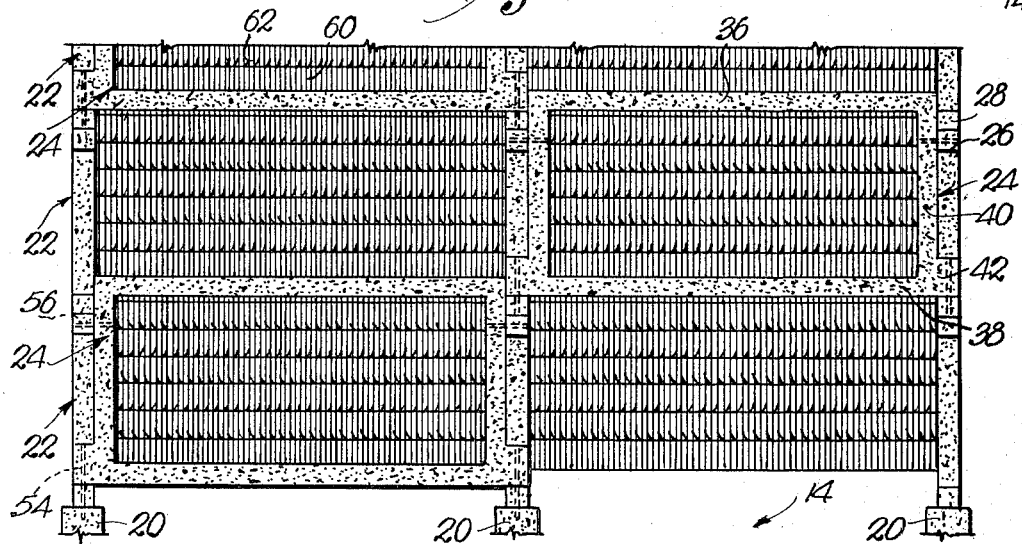
FIG. 3 is an enlarged, fragmentary, elevational view of the structure from the inner end of the latter.

The prefabricated components which comprise structure 10 include elongated, generally planar panel units 22 which extend between the inlet and outlet sides 16 and 18 of structure 10 and planar bracing elements 24 which extend laterally of the units 22. Each unit 22 is of open-frame construction having a pair of vertically spaced-apart, upper and lower members 26 and 28 respectively, and a plurality of horizontally spaced-apart, vertically extending struts 30 interposed between members 26 and 28. The members 26 and 28 thus present opposed faces or edges 32 and 34 which are disposed in abutment with the edges 32 and 34 of adjacent units 22 when the latter are stacked one on top of the other to produce a multi-level uprights, each pair of the latter defining a fill-receiving bay 35, two of which are shown in FIG. 1. As shown best in FIGS. 1-3, the member 28 of the lowermost unit 22 in each upright rests directly upon an underlying pier 20 which may be of substantially greater width than member 28 if desired.

Preferably, in accordance with the fireproof goals of the present invention, the units 22 are constructed from poured concrete or other suitable non-flamable material. Such material, if of approximately the same density as concrete, will render the units 22 relatively massive, such that their relatively heavy masses contribute substantially to the stability of each upright when the units 22 thereof are stacked on edge. In this respect, it is not unusual for the units 22 to individually weigh in excess of 4 tons.

Each element 24 is of open-frame construction and rectangular configuration having opposed, spaced-apart, upper and lower segments 36 and 38 respectively, and spaced-apart, vertically extending ends 40 between segments 36 and 38. A flat downwardly facing edge 39 is defined along the bottom of each segment 38, and a pair of feet 42 project outwardly from opposite ends 40 as extensions of the lower segment 38. Therefore, when elements 24 are inserted within the bays 35 interposed between opposed units 22 of the same level, the feet 42 with edge 39 may rest upon and be supported by the proximal lower member 28 of the respective units 22. Each element 24 is preferably constructed of a fireproof material such as prestressed concrete, thereby not only providing the desired fireproof quality but also providing each element 24 with a mass which contributes substantially to the stability and rigidity of structure 10 when all of the elements 24 are properly disposed in their respective positions.

It is contemplated that for ease of manufacture and to facilitate erection of the structure 10, the elements 24 will all be of identical dimensions in the case of a rectilinear tower or will decrease in length as the center is approached of circular or hyperbolic towers having fill structure around the perimeter thereof. Such dimensional identity is not, however, critical to the principles of the present invention and the elements 24 of adjacent bays 35 could, if desired, be of different sizes. Similarly, the units 22 may be identical in configuration and size, depending upon the desired shape which the structure 10 will assume upon erection. For example, structure 10 may be provided with an essentially cubical configuration wherein the air inlet side 16 and the air outlet side 18 are substantially parallel to one another, in which case all of the units 22 in each upright and in each level are identical to one another. On the other hand, as represented throughout the Figures, the structure 10 may be provided with an inclined inlet side 16 so that sides 16 and 18 converge as the collection means 14 is approached. This, of course, results in a substantial conservation of building materials as well as eliminating heat exchange fill within structure 10 which is otherwise wasted because of a "water pullback" phenomenon experienced in water cooling towers. Thus, in this situation where inlet side 16 is inclined, the units 22 of the same level will be identical in size and configuration to one another, but those of higher levels will be of progressively increased lengths in order to render the inlet side 16 inclined.

Each of the units 22 may be provided with one or more diagonals 44 between the upper and lower members 26 and 28 thereof, and all of the units 22, except perhaps the uppermost units of the uprights, are provided with inclined, outer ends 46 and vertical, inner ends 48, the uppermost units 22 as depicted in the drawings, for illustrative purposes only, may have parallel, outer and inner ends 46 and 48. Each unit 22 is also provided with an outwardly and upwardly projecting support arm 50 integral with end 46 which cooperates with the corresponding arm 50 of an adjacent unit 22 in the same level to carry an air inlet louver 52, preferably constructed of concrete or other fireproof material. The members 26 and 28 of each unit 22 at the inner end 48 thereof extend for a distance beyond the end strut 30 to provide means for supporting an element 24 at this location and to provide means for interlocking adjacent levels with one another as hereinafter described.

Figure 6:
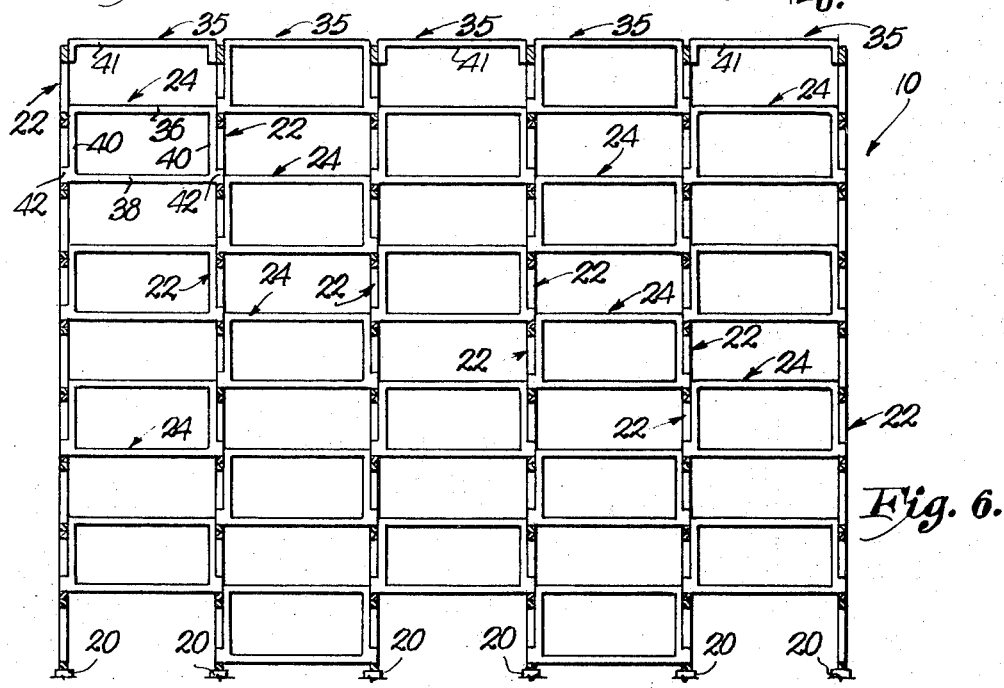
FIG. 6 is a fragmentary, vertical cross sectional view of the structure on a reduced scale taken along lines 6—6 of FIG. 5.

The special bracing elements 24 and their particular arrangement as components of structure 10 provide a cohesiveness and rigidity to structure 10 which is more than sufficient to resist the application of external forces to structure 10 such as by earthquake tremors or strong winds. As best seen in FIG. 6, although also indicated clearly throughout the remaining figures, the bracing elements 24 are arranged in diagonally declining, parallel rows, each adjacent pair of elements 24 in a row being in partial juxtaposition with one another for force-transmitting purposes. In this regard, it may be seen that the elements 24 in each row reside in a common plane and that foot 42 of each element 24 abuts the uppermost region of the end 40 of the next lower element 24 in the row so that any force applied laterally to one element in the row through the plane of the element is transmitted diagonally downwardly through successive elements in the row until reaching the piers 20, at which point the force is terminated.

This diagonal arrangement of the elements 24 is especially valuable in situations in which structure 10 is relatively tall, as in the case of high capacity water cooling towers. In these situations, earthquake tremors or winds in the upper reaches of structure 10 can reach high enough intensities to impart significant forces to the structure 10 sufficient to tend to topple or collapse the same. However, instead of the forces generated by such earth tremors or winds simply being directed laterally through structure 10 which would not significantly impede their effects, the forces are "stair-stepped" down structure 10 in parallel paths through the rows of mutually cooperating elements 24 so that such forces are resisted by the ground itself, thereby effectively controlling such forces.

It may also be advantageous to provide shallow inverted U-frame elements 41 between each adjacent pair of spaced frames 24 located at the upper extremities of bays 35 which cooperate to present the composite structure 10 (see FIG. 6). Fasteners such as through bolts are also used to join the downturned legs of each U-frame 41 element to proximal panel units 22.

Structure 10 may advantageously be erected one bay 35 at a time in order to benefit from construction economies which are derived as a result of this construction technique. To this end, the bays 35 may be formed by successively hoisting and stacking the units 22 in edgewise disposition on top of one another above a pair of the piers 20, with alternating levels receiving a bracing element 24. Subsequently, a second bay 35 may be constructed alongside the initial bay 35 by simply erecting another upright from a stacked formation of units 22 and providing a bracing element 24 between opposed units 22 at alternate levels in staggered relationship to those of the first bay 35.

This process may be repeated several times over until a structure having the desired overall length and number of bays 35 is completed. Accordingly, it may be appreciated that the hoisting equipment for lifting the respective units 22 and elements 24 into their proper locations may be stationed at a single position adjacent each individual bay 35 until the latter has been completely formed, at which time the equipment may be moved along the line for erecting the next adjacent bay 35. The time consuming and laborious task of reanchoring the lifting equipment and moving it repeatedly back and forth between adjacent stations such as would be necessary when producing one complete level of structure at a time are thereby eliminated. It is only necessary to move the equipment from one station to the next after each full bay 35 has been completed.

Figure 4:
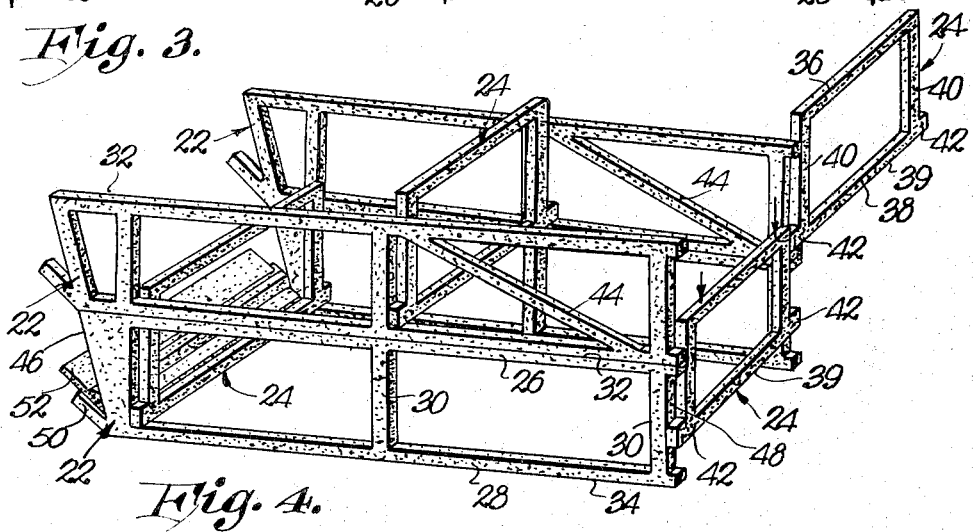
FIG. 4 is a diagrammatic, perspective view illustrating the interrelationship between the components of the structure.

Each pair of the units 22 has an element 24 at alternate struts 30 as shown best in FIGS. 1 and 4. The extensions of the lower members 28 at the inner ends 48 of the units 22 receive the feet 42 of elements 24 to support the latter in edge-standing disposition at the inner end locations. Similarly, the lower members 28 support the elements 24 by their feet 42 adjacent the selected struts 30 within the interior of the structure 10. The sheer mass of the elements 24 bearing fully upon the lower members 28 thereby contributes greatly to the stabilization of the units 22.

It is important to recognize that the elements 24 are of such a height that the ends 40 thereof extend upwardly beyond the upper members 26 when elements 24 are standing on the lower members 28. Therefore, the ends 40 of each element 24 preclude movement of an adjacent pair of the units 22 toward one another by blocking the upper members 26. In this manner, the elements 24 in adjacent bays 35 in conjunction with the upper row of spaced U-frames 41 cooperate to rigidly brace all of the units 22 of the corresponding level against movement. It will be appreciated that such mutual cooperation among the elements 24 within a single level can be especially significant in circular cooling towers in which each level is a continuous annular ring. Similarly, the diagonally descending relationship of the elements 24 to one another is especially effective in a circular tower whether or not it is of continuous circular extent or is made up of a number of individual arcuate segments.

It should also be recognized that structural rigidity is effected not only because of the relationship of elements 24 of adjacent bays 35 to one another, but also because of the relationship of each element 24 to the units 22 in the level thereabove. The ends 40 of the elements 24 project upwardly beyond the level in which they are supported into the next higher level so that the upper portions of ends 40 are disposed alongside the proximal lower members 28 of the units 22 in the next higher level. In this manner the elements 24 not only serve to brace the units 22 of the level in which the respective elements 24 are supported, but also to brace those units 22 of the next higher level. Thus, units 22 of adjacent levels effectively constrain one another against movement to interlock all of the levels into a rigid construction.

The unique manner in which each element 24 not only braces the units 22 of its level, but also those of an adjacent level as well, coupled with the sheer mass of the units 22 and elements 24 and the diagonally declining relationship of the elements 24 to one another, assures that structure 10 is extremely rigid and not subject to shifting or movement in any way in spite of the edge-standing dispositions of units 22 and elements 24. If desired for a specific installation, however, suitable fastener means may be provided to interconnect the units 22, elements 24 and their respective levels together. Such fastener means may take the form of upright bolts 54 (FIG. 3) which extend through the lower member 28 of each unit 22 in alignment with suitable openings therefor within the feet 42 of proximal elements 24, as well as horizontally extending bolts 56 which pass through the upper members 26 of each unit 22 for extension through the proximal ends 40 of adjacent elements 24. Upright bolts cast into piers 20 and projecting upwardly therefrom pass through the member 28 of the lowermost units 22 supported by a respective pier.

The heat exchange fill may be positioned within structure 10 and supported in place through the use of transversely extending channel shaped beams 58 of prestressed concrete which span the lower members 28 of a pair of opposed units 22. A plurality of beams 58 may be provided between each pair of the struts 30 and individual grids 60 may be suspended from the beams 58 with the plane of the grids 60 extending transversely of the units 22 so that the opposed faces of the grids 60 are essentially perpendicular to the flow of air from inlet side 16 to outlet side 18 of structure 10. Suitable elongated slats 62 or the like (indicated schematically in FIG. 3) may be supported within the openings of the grids 60 extending longitudinally of the units 22 in the direction of airflow through structure 10. Preferably, such slats 62 are constructed of asbestos concrete board material and have a cross-sectional S-curve configuration.

Having thus described the invention, what is claimed as new and desired to be secured by Letters Patent is:

1. In a water cooling tower having hot water distributor and cold water collection means underlying said distributor in spaced relation thereto, structure between the distributor and the collection means for supporting heat exchange fill in disposition to receive water gravitating from the distributor toward the collection means, said structure comprising:
   a plurality of prefab frame units stacked one on top of the other to present a plurality of horizontally spaced, multi-level uprights defining at least one fill-receiving bay; and
   a plurality of prefab bracing elements within each bay interposed between horizontally opposed pairs of frame units for rigidifying and stabilizing the uprights, the elements of adjacent bays being disposed in diagonal force-transmitting relationship with one another to resist external forces applied to the structure by directing such forces downwardly to ground level.

2. In a cooling tower as claimed in claim 1, wherein said elements are disposed in a plurality of diagonally descending rows crossing the bays of the structure.

3. In a cooling tower as claimed in claim 2, wherein said rows are parallel with one another.

4. In a cooling tower as claimed in claim 2, wherein the elements in each row are disposed in a common vertical plane.

5. In a cooling tower as claimed in claim 2, wherein each element in a row projects beyond its respective level into a next adjacent level in juxaposition to the next element in the row.

6. In a cooling tower as claimed in claim 1, wherein each of said elements is essentially planar having a normally lower edge for standing of the elements on their respective side edges.

7. In a cooling tower as claimed in claim 6, wherein each of said units is provided with means for supporting a corresponding element by its said edge.

8. In a cooling tower as claimed in claim 7, wherein each of said elements is essentially planar and of open-frame construction having a pair of spaced-apart, normally upper and lower segments, each said lower segment presenting said edge.

9. In a cooling tower as claimed in claim 8, wherein each of said elements is provided with a pair of opposed, normally upright ends extending between its upper and lower segments for blocking movement toward one another of the units supporting the element.

10. In a cooling tower as claimed in claim 9, wherein said ends of each element also block movement of the units next above the units supporting the element.

11. In a cooling tower as claimed in claim 1, wherein said units are each essentially planar having a pair of upper and lower edges for edgewise stacking of the units.

12. In a cooling tower as claimed in claim 11, wherein each of said units is of open-frame construction having a pair of spaced-apart, normally upper and lower members presenting said edges.

13. In a cooling tower as claimed in claim 12, wherein each of said units has a number of spaced, normally upright struts extending between said members thereof, there being an element located adjacent alternate struts of each unit.

14. In a cooling tower as claimed in claim 1, wherein each of said units has a pair of normally inner and outer ends, there being means adjacent said outer end of each unit integral therewith for supporting an air inlet louver.

15. In a cooling tower as claimed in claim 1, wherein said units are of progressively increased lengths as the uppermost level is approached.

16. In a cooling tower as claimed in claim 15, wherein each of said units has an inner end normally adjacent the plenum chamber of the tower and an outer end spaced from said inner end, said outer ends of the units in each upright converging downwardly toward their respective inner ends and being in substantial inclined alignment with one another to render the corresponding side of the structure inclined.

17. In a cooling tower as claimed in claim 1, wherein said frame units and said bracing elements are constructed of prestressed concrete.

18. In a cooling tower as claimed in claim 1, wherein the respective masses of the frame units and the bracing elements are sufficient to maintain the same in mutually cooperating relationship with one another.

* * * * *